(12) United States Patent
Mu et al.

(10) Patent No.: US 7,965,683 B2
(45) Date of Patent: Jun. 21, 2011

(54) MECHANISM FOR MAXIMIZING UPLINK BANDWIDTH BY OVERLAPPING CONTROL REGIONS IN WIMAX SYSTEMS

(75) Inventors: Chen Mu, Hoffman Estates, IL (US); Prachi P. Kumar, Palatine, IL (US); Nghia T. Vuong, Mount Prospect, IL (US); Jun Wang, Evanston, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 589 days.

(21) Appl. No.: 12/139,700

(22) Filed: Jun. 16, 2008

(65) Prior Publication Data

US 2009/0310542 A1 Dec. 17, 2009

(51) Int. Cl.
*H04W 4/00* (2009.01)
(52) U.S. Cl. ........................................ 370/330
(58) Field of Classification Search .................. None
See application file for complete search history.

(56) References Cited

U.S. PATENT DOCUMENTS

| 2006/0195767 | A1 | 8/2006 | Ihm et al. | |
|---|---|---|---|---|
| 2007/0177541 | A1 | 8/2007 | Kwon et al. | |
| 2007/0254679 | A1 | 11/2007 | Montojo et al. | |
| 2008/0175195 | A1* | 7/2008 | Cho et al. | 370/329 |
| 2009/0111480 | A1* | 4/2009 | Wu et al. | 455/452.2 |
| 2009/0232070 | A1* | 9/2009 | Muharemovic et al. | 370/329 |
| 2011/0002372 | A1* | 1/2011 | Li et al. | 375/227 |

FOREIGN PATENT DOCUMENTS

WO 2008054149 A1 5/2008

OTHER PUBLICATIONS

P802.16Rev2/D0d (Aug. 2007), Part 16: Air Interface for Broadband Wireless Access Systems, Draft Standard for Local and metropolitan area networks, IEEE WirelessMAN 802.16, Copyright 2007, Section 8.4.5.4.25.

Moon, Sung Don: "The International Search Report and The Written Opinion of the International Search Authority, or the Declaration", Korean Intellectual Property Office, Daejeon, Republic of Korea, completed: Dec. 7, 2009, mailed: Dec. 23, 2009.

\* cited by examiner

*Primary Examiner* — Chirag G Shah
*Assistant Examiner* — Amarnauth Persaud
(74) *Attorney, Agent, or Firm* — Steven A. May

(57) ABSTRACT

A method and system for allocating a particular uplink control region to both HARQ ACKCH and CQICH in order to maximize uplink bandwidth for data transfer in a communication network. A control region scheduling (CRS) utility assigns a higher priority to HARQ ACKCH relative to CQICH. When both HARQ ACKCH and CQICH are to be allocated for a subscriber in the same region in the same frame, HARQ ACKCH is allocated in the region while CQICH is rejected. As the substitute to the rejected CQICH, the CRS utility may use current uplink channel quality information in combination with the corresponding HARQ ACK transmission to estimate the downlink channel quality information for the subscriber. Upon receiving the HARQ ACK information, the CRS utility updates the subscriber(s) uplink channel quality information. The CRS utility also provides a configurable option of activating or de-activating the sharing of the uplink control region.

8 Claims, 4 Drawing Sheets

MECHANISM FOR MAXIMIZING UPLINK BANDWIDTH BY OVERLAPPING CONTROL REGIONS IN WIMAX SYSTEMS

BACKGROUND

1. Technical Field

The present invention generally relates to wireless communication systems and in particular to control signaling in wireless communication systems.

2. Description of the Related Art

In current Worldwide Interoperability for Microwave Access (WiMAX) system implementations and the Institute of Electrical and Electronics Engineers (IEEE) 802.16e specifications, uplink sub-frame consists of control regions (for example, Channel Quality Indicator Channel (CQICH) and Hybrid Automatic Repeat Request Acknowledgement (HARQ ACK) regions) and data burst regions. Control regions take precedence over the data burst regions. In general, control regions occupy a small portion of the uplink sub-frame in order to maintain adequate uplink bandwidth for data transmission. However, because of the priority given to the control regions, in certain supported configurations, the available uplink bandwidth becomes so small that after the bandwidth is allocated for all control regions, there is not enough bandwidth for network entry messages.

Without network entry messages, a subscriber may be incapable of reporting the downlink channel quality information. Without this information, a base station access point media access control (MAC) layer may be unable to determine what modulation type to use on downlink data transfer for the subscriber. Consequently, some configurations are prevented from ever using these control region dominated systems. In particular, 5 MHz bandwidth and segmented partial usage of sub-carriers (PUSC) configurations are not compatible in systems in which the control region dominates the uplink bandwidth.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
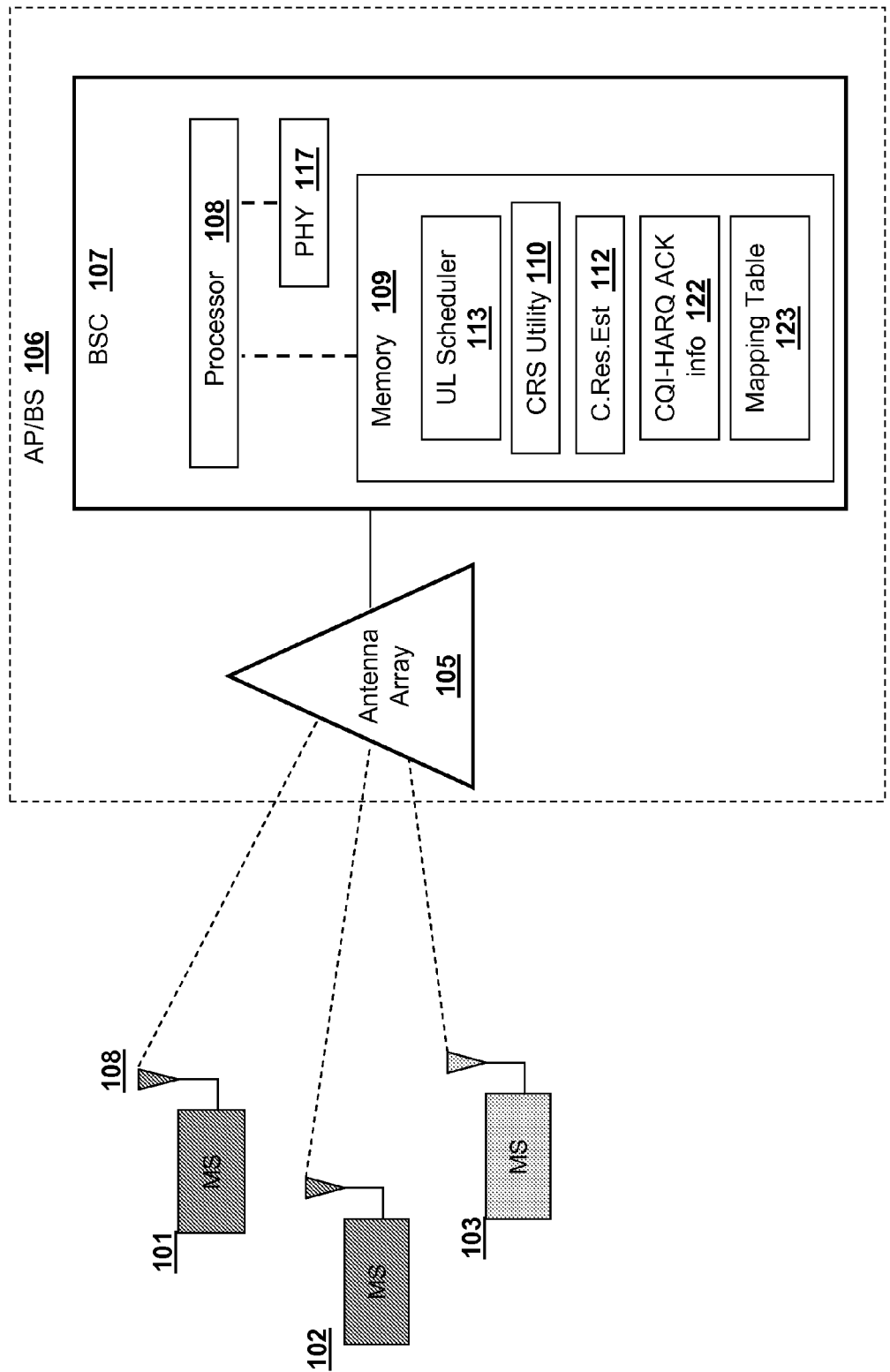
FIG. 1 is a block diagram representation of a wireless communication system, in which features of the illustrative embodiments may be practiced.

The illustrative embodiments provide a method and system for allocating a particular uplink control region to both a Hybrid Automatic Repeat Request (HARQ) Acknowledgment Channel (ACKCH) and a Channel Quality Indicator Channel (CQICH) in order to maximize uplink bandwidth for data transfer in a communication network. A control region scheduling (CRS) utility assigns a higher priority to HARQ ACKCH relative to CQICH. When both HARQ ACKCH and CQICH are to be allocated for a subscriber in the same region in the same frame, HARQ ACKCH is allocated in the region while CQICH is rejected. As the substitute to the rejected CQICH, the CRS utility may use uplink channel quality information from earlier transmissions in combination with the corresponding HARQ ACK transmission to estimate the downlink channel quality information for the subscriber. Upon receiving the HARQ ACK, the CRS utility updates the subscriber(s) uplink channel quality information. The CRS utility also provides a configurable option of activating or de-activating the sharing of the uplink control region.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to FIG. 1, a wireless communication system is illustrated, according to one embodiment of the invention. Communication system (CS) 100 comprises multiple mobile stations (MSs), also referred to herein as users or subscribers, 101-103 (three shown), which all wirelessly connect to a base-station 106 via multiple receiving antenna, collectively illustrated as antenna array 105. The base station also is illustrated and referred to herein as an access point (AP). Base station 106 comprises receiver and transmitter sections (not shown in FIG. 1) and a Base Station Controller (BSC) 107. BSC 107 comprises a Processor 108, such as one or more microprocessors, microcontrollers, digital signal processors (DSPs), combinations thereof or such other devices known to those having ordinary skill in the art. The particular operations/functions of processor 108, and respectively thus of BSC 107, are determined by an execution of software instructions and routines that are stored in an at least one memory device 109 associated with the processor, such as random access memory (RAM), dynamic random access memory (DRAM), and/or read only memory (ROM) or equivalents thereof, that store data and programs that may be executed by the corresponding processor. Memory 109 includes a Channel Response Estimator module 112, a CQI-HARQ ACK information module 122, a mapping table 123, a control region scheduling (CRS) utility module 110, and uplink (UL) scheduler module 113, which modules comprise programs, instructions, and data that are executed by processor 108. BSC 107 further includes PHY (logic) 117.

In actual implementation, UL scheduler 113, PHY 117, channel response estimator 112 and CRS utility 110 may be combined in a single component to collectively provide the various functions of each individual component. For simplicity, CRS utility 110 is illustrated and described as a stand alone or separate software/firmware component, which provides specific functions, as described below.

Among the software code/instructions/logic provided by UL scheduler 113, CQI-HARQ ACK information module 122, channel response estimator module 112, and CRS utility module 110 are, respectively: (a) logic for allocating an uplink control region to both HARQ ACKCH and downlink (DL) CQICH; (b) logic for assigning a higher priority to HARQ ACKCH relative to CQICH; and (c) logic for estimating the downlink channel quality information (CQI) for the subscriber when the current CQICH is rejected, based on HARQ ACK and/or priority settings. For simplicity of the description, the collective body of code that implements these various features is referred to hereinafter as CRS utility 110. Furthermore, functions described herein as being performed by base station 106 preferably are performed by BSC 107, and more particularly by processor 108 based on instructions and data maintained in at least one memory device 109.

Figure 2:
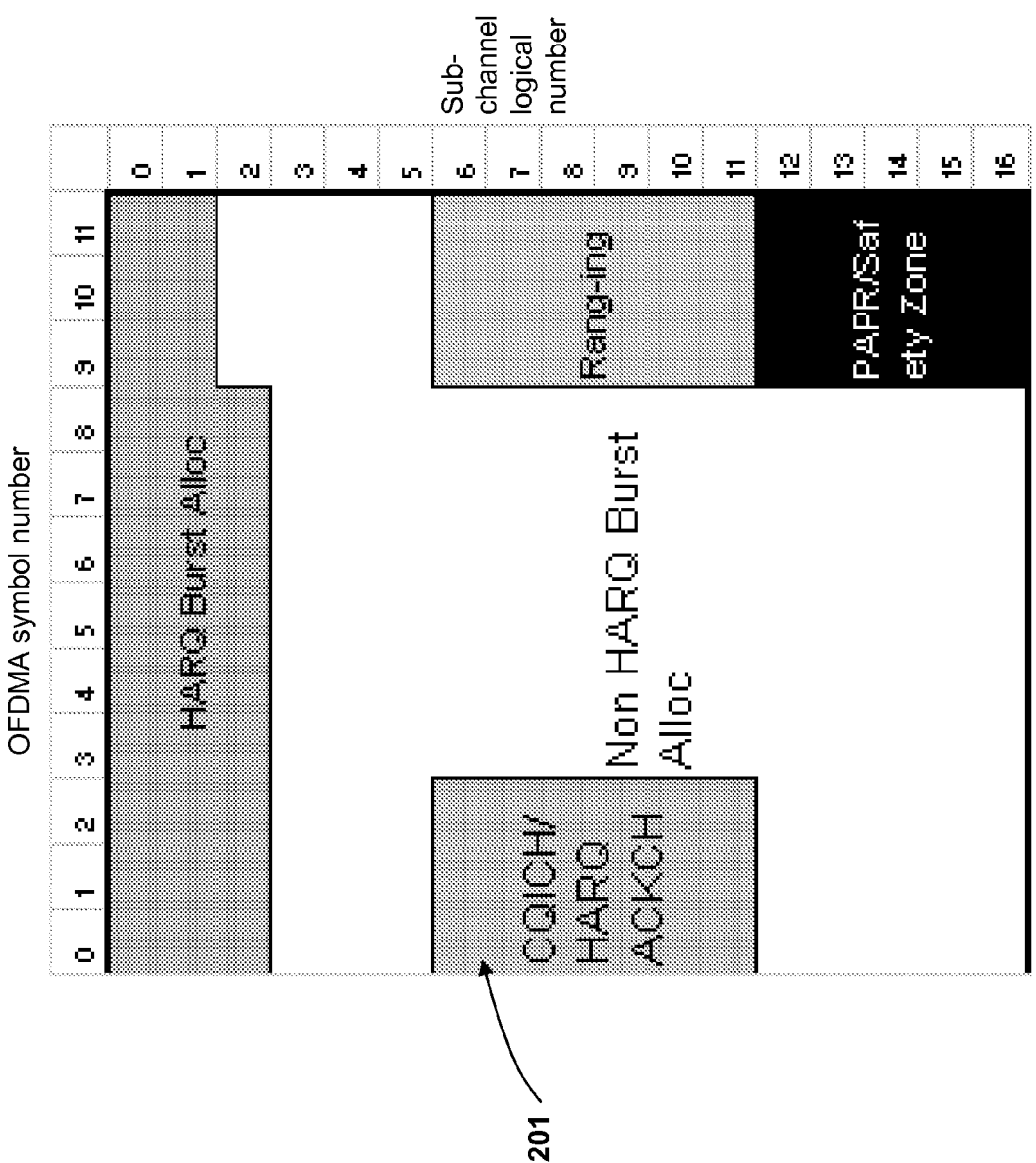
FIG. 2 illustrates an uplink sub-frame highlighting a set of control regions, according to one embodiment of the invention.

With reference now to FIG. 2, an uplink sub-frame 200 highlighting a set of control regions is illustrated, according to one embodiment of the invention. Uplink (UL) sub-frame 200 comprises of a number of control regions, including a shared CQICH and HARQ ACKCH control region, illustrated as CQICH/HARQ ACKCH 201.

Conventionally, CQICH and HARQ ACKCH regions are separate control regions in the UL sub-frame. However, in the illustrative embodiment, CQICH/HARQ ACKCH 201 is utilized by both the CQICH signal and the HARQ ACK signal at the same time, in the uplink sub-frame. This means that in one frame, the same region may be used for either HARQ ACK information or CQICH information, or both. However, HARQ ACKCH has higher priority than CQICH. When both HARQ ACKCH and CQICH overlap in one frame, HARQ ACKCH definition overrides the overlapping CQICH definition.

When the CQICH is rejected, a mobile station (MS), such as MSs 101-103, is unable to report the downlink channel information on time. In this case, CRS utility 110 employs un-expired uplink channel quality information, for example, from previously received control data, to roughly estimate the downlink channel quality information for the subscriber. Also, upon receiving the HARQ ACK information from the subscriber, CRS utility 110 may obtain and update the subscriber's uplink channel quality information. Mapping table 123 then may be created based on empirical data and may be used for mapping downlink channel information from the uplink channel information.

The position and size of CQICH/HARQ ACKCH 201 is generally fixed for every uplink sub-frame. The size and position of CQICH/HARQ ACKCH 201 may be set based on a system configuration.

The ability to utilize a particular control region, such as control region 201, as an overlapping/shared HARQ ACKCH region and CQICH region is configurable (i.e., may be turned on or off) by base station 106, such as a WiMAX base station. In one embodiment, since HARQ ACKCH overlaps with CQICH, the previously designated HARQ ACKCH control region may be completely removed or may be made smaller in size.

As an example illustrating the benefits of the invention, in a WiMAX uplink sub-frame having a bandwidth of 5 MHz and a DL/UL Ratio of 75/25, the WiMAX UL sub-frame comprises a total of 68 "slots". The term "slot" refers to a unit in the OFDMA frame, defined as "x" number of symbols (time) by "y" number of sub-channels. In a WIMAX specific UL frame for PUSC permutation, a slot is 3 symbols by 2 sub-channels and is the minimum data allocation unit in a WiMAX frame. With the conventional methods, the number of slots that may be used for control channel information is 22 slots (including 5 slots for CQICH, 6 slots for HARQ ACKCH, 6 slots for Ranging and 5 slots for Safety Zone). Only a maximum of 46 slots may be used for data. However, in the illustrative embodiments, 6 slots (instead of a previous total of 11 slots) are used for both CQICH and HARQ ACKCH. Thus, the UL data bandwidth increase is ($5/46=$) 10.8%.

Figure 3:
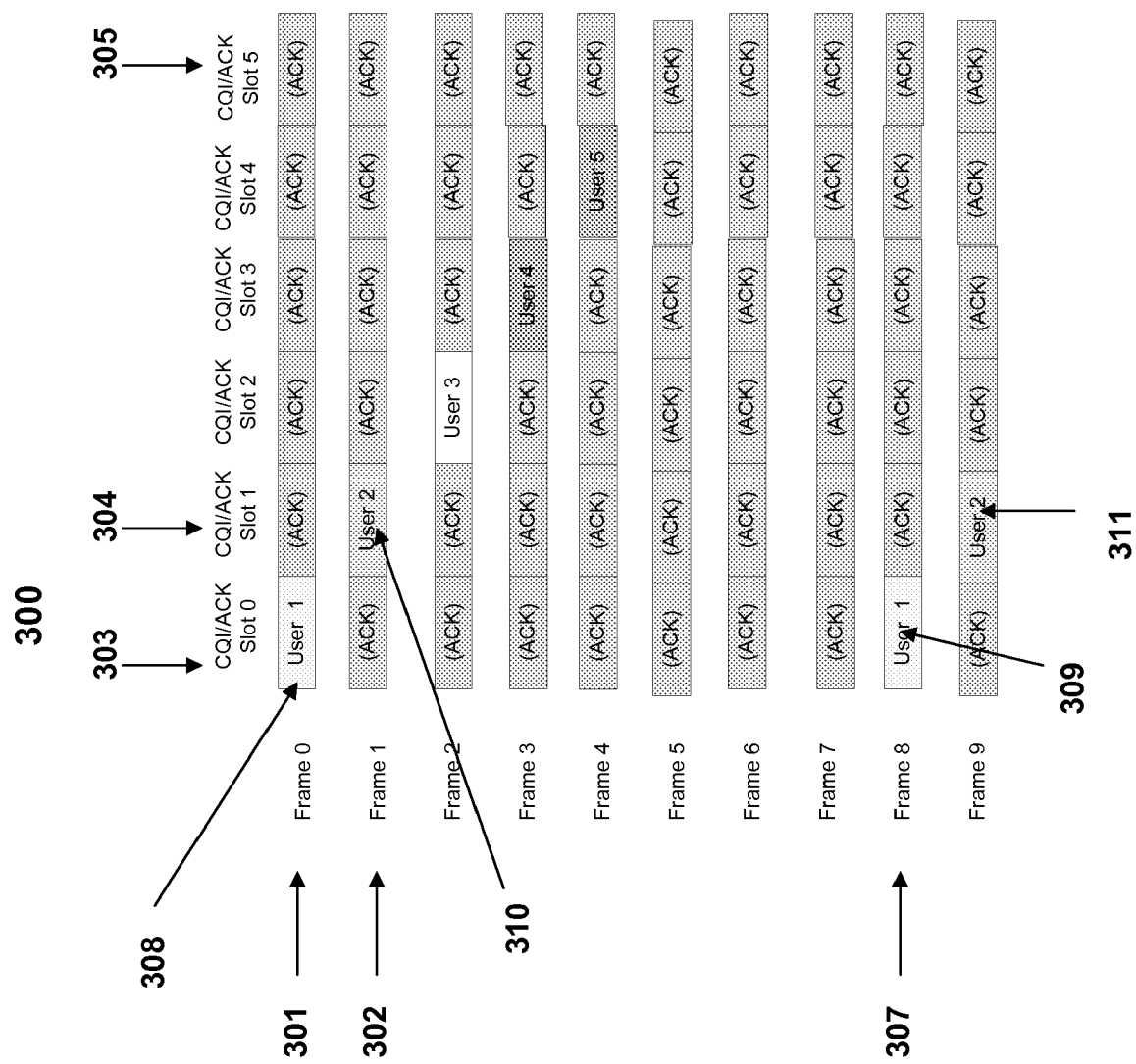
FIG. 3 is an example collection of frames illustrating a CQICH and HARQ ACK control region and slot allocation, according to one embodiment of the invention.

FIG. 3 is an example collection of frames illustrating a CQICH/HARQ ACKCH control region and slot allocation, according to one embodiment of the invention. FIG. 3 is an example for which five subscribers such as MSs 101-103 are transmitting UL data to a base station, such as base station 106. Each subscriber, or MS, reports CQICH downlink information every reporting period, for example, every 8 frames.

Frame-set 300 comprises multiple exemplary frames, including frame 0 301, frame-1 302 and frame-8 307. Each frame includes a CQICH HARQ ACKCH control region. In turn, the CQICH HARQ ACKCH control region of each frame is divided into a number of slots, depicted in FIG. 3 as CQI/ACK slots 0-5, including CQI/ACK slot 0 303, CQI/ACK slot 1 304 and CQI/ACK slot 5 305. CQI/ACK slot 0 303 within frame 0 301 is illustrated as being assigned as a CQICH to user 1, that is, as a first CQICH-user1 (user 1 being, for example, MS 101) 308. CQI/ACK slot 0 303 within frame 8 307 also is illustrated as being assigned as a CQICH to user 1, that is, as a second CQICH-user1 309. Similarly, CQI/ACK slot 1 304 within frame 1 302 is illustrated as being assigned as a CQICH to user 2, that is, as a first CQICH-user2 (user 2 being, for example, MS 102) 310, and CQI/ACK slot 1 304 within frame 9 also is illustrated as being assigned as a CQICH to user 2, that is, as a second CQICH-user2 311. FIG. 3 further depicts CQI/ACK slot 2 within frame 2 as being assigned as a CQICH to user 3, CQI/ACK slot 3 within frame 3 as being assigned as a CQICH to user 4, and CQI/ACK slot 4 within frame 4 as being assigned as a CQICH to user 5. All slots of the CQICH HARQ ACKCH control region (CQI/ACK slots 0-5) of each frame 0-9 not allocated as a CQICH to an MS are illustrated as being assigned as a HARQ ACKCH.

In a system employing the conventional method and having, for example, five (5) MSs, all five MSs transmit CQI information within the same frame. With these conventional methods, CQICH and HARQ ACKCH are separate and distinct regions. The next transmission of CQI information for these 5 MSs is 8 frames, that is, one period, later. Thus, the conventional method wastes 35 CQICH slots every period, that is, (5 CQICH slots per frame–one per MS)*7 frames=35 wasted slots. By contrast, in the illustrative embodiments of the present invention, CQICH and HARQ ACKCH are shared regions. By providing for CQICH and HARQ ACKCH to share their regions, the inventive methods of allocating control regions eliminate slot wastage. Unlike conventional allocation methods, frame-set 300 illustrates an efficient manner of allocating CQICH/HARQ ACKCH slots, which increases bandwidth for DL data transmissions.

CRS utility 110 further facilitates efficient slot allocation as illustrated within frame-set 300 by providing an offset which is appropriately set to avoid multiple MSs reporting CQI in the same frame. For example, user 1 and user 2 always transmit CQICH information in different frames. As illustrated, user 1 transmits CQICH information in first CQICH-user1 308 of frame 0 and second CQICH-user1 309 of frame 8, and user 2 transmits CQICH information in first CQICH-user2 310 of frame 1 and second CQICH-user2 311 of frame 9. Each user transmits CQICH information once every period, that is, every eighth frame.

Thus, as depicted in FIG. 3, CRS utility 110 effectively designates unused CQICH slots as HARQ ACKCH slots when no subscriber is scheduled to transmit on that CQICH slot. In addition, when both HARQ ACKCH and CQICH overlap in one frame, HARQ ACKCH definition overrides the overlapping CQICH definition, preferably when a previous and un-expired set of CQICH information exists that may be used to determine a channel quality. Consequently, CRS utility 110 increases bandwidth for DL data transmissions by minimizing slot wastage during the transmission of control data.

Figure 4:
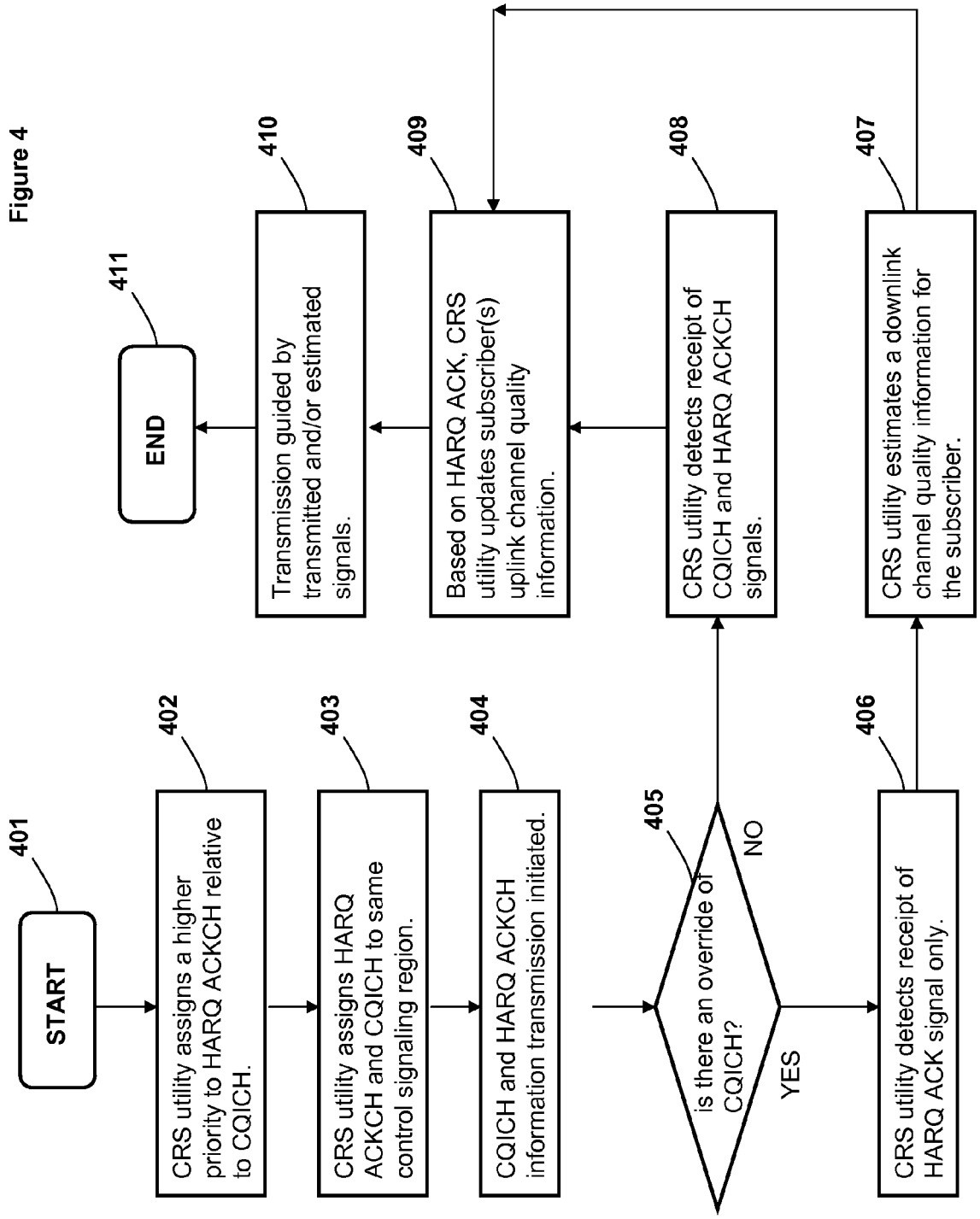
FIG. 4 is a flow chart illustrating the process of allocating a particular control region to both CQICH and HARQ ACKCH, according to one embodiment of the invention.

FIG. 4 is a flow chart illustrating a method by which a control region is allocated by base station 106, and in particular BSC 107, to both CQICH and HARQ ACKCH for a subscriber, such as MSs 101-103, in accordance with an embodiment of the present invention. Although the methods illustrated in FIG. 4 may be described with reference to components shown in FIGS. 1-3, it should be understood that this is merely for convenience and alternative components and/or configurations thereof can be employed when implementing the various methods. Key portions of the methods may be completed by CRS utility 110 executing within CS 100 and controlling specific operations of/on CS 100, and the methods are thus described from the perspective of either/both CRS utility 110 and CS 100.

The method depicted in FIG. 4 begins at initiator block 401 and proceeds to block 402, at which CRS utility 110 assigns a higher priority to the HARQ ACKCH relative to CQICH. At block 403, CRS utility 110 assigns HARQ ACKCH and CQICH to a same control signaling region.

CQICH information and HARQ ACK information transmissions are initiated, as shown at block 404. At decision block 405, CRS utility 110 determines whether an override of CQICH occurs to initiate a process to determine the quality of the downlink channel. If at block 405, CRS utility 110 determines that an override of CQICH occurs, the process proceeds to block 406, at which CRS utility 110 detects receipt of the HARQ ACK signal only. Following block 406, CRS utility 110, and in particular channel response estimator 112, estimates downlink channel quality information for the subscriber based on an un-expired set of CQICH information previously received from the subscriber, as shown at block 407. Furthermore, empirical data from mapping table 123, which maps uplink channel quality information to downlink channel quality information, may be utilized. The method then proceeds to block 409.

If at block 405, CRS utility 110 determines that no override of CQICH occurs, the method proceeds to block 408, at which CRS utility 110 detects receipt of both CQICH and HARQ ACKCH signals. The method then proceeds to block 409.

At block 409, based on the detected HARQ ACK information, CRS utility 110 updates subscriber(s) uplink channel quality information. At block 410, CRS utility 110 schedules data transmission with an aid of transmitted CQICH information, HARQ ARQ signals and/or estimated signals. The flow chart ends at block 411.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Generally, the above illustrated and described embodiments provide a method implemented within a wireless communication system, which method includes the following: (1) assigning a higher priority to HARQ ACKCH relative to downlink CQICH; and (2) allocating one of HARQ ACKCH and CQICH to a shared control region within a resource frame. The method further includes accepting only the HARQ ACKCH within the control region as a result of an override of the CQICH, in response to an allocation of both HARQ ACKCH and CQICH to a same control region within a same resource frame. Also, the method includes estimating downlink channel quality information for the subscriber based on a current set of uplink channel quality information, in response to a rejection of the CQICH information.

Additionally, the method provides: (1) retrieving a mapping table of empirical data relating uplink and downlink channel information; (2) generating downlink channel information from uplink channel information utilizing the mapping table; and (3) providing a scheduling offset to avoid multiple users reporting the respective CQICH information in the same frame.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional base station with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for allocating a control region to a subscriber in a wireless communication system comprising:
   assigning a higher priority to Hybrid Automatic Repeat Request Acknowledgement (HARQ) Acknowledgement Channel (ACKCH) relative to downlink Channel Quality Indicator Channel (CQICH);
   allocating one of HARQ ACKCH and CQICH to a shared control region within a resource frame;
   in response to an allocation of both HARQ ACKCH and CQICH to a same control region within a same resource frame, accepting only HARQ ACKCH within the control region as a result of an override of the CQICH, based on the higher relative priority, wherein the override occurs when a previous and un-expired set of CQICH information exists;
   in response to a rejection of CQICH as a result of an override, estimating a downlink channel quality information for the subscriber based on a current set of uplink channel quality information; and
   in response to a reception of the HARQ ACKCH information, updating the subscriber uplink channel quality information.

2. The method of claim 1 further comprising:
   maintaining a location of the control region designated for HARQ ACKCH and CQICH for uplink sub-frames; and
   providing a configurable option to activate and de-activate the sharing of the uplink control region for HARQ ACKCH and CQICH.

3. The method of claim 1, wherein said estimating further comprises:
   retrieving a mapping table of empirical data relating uplink and downlink channel information; and
   generating downlink channel information from uplink channel information utilizing the mapping table.

4. The method of claim 1, further comprising:
   providing a scheduling offset, wherein said offset is appropriately determined to avoid multiple users reporting CQICH information in a same frame; and
   assigning CQICH information to a frame based on the scheduling offset.

5. A base station comprising:
   a processor;
   a utility that allocates a control region to a subscriber when executed by the processor, the utility configured to:
   assign a higher priority to Hybrid Automatic Repeat Request Acknowledgement (HARQ) Acknowledgement Channel (ACKCH) relative to downlink Channel Quality Indicator Channel (CQICH);
   allocate one of HARQ ACKCH and CQICH to a shared control region within a resource frame;
   in response to an allocation of both HARQ ACKCH and CQICH to a same control region within a same resource frame, accept only HARQ ACKCH within the control region as a result of an override of the CQICH, based on the higher relative priority, wherein said override occurs when a previous and un-expired set of CQICH information exists;
   in response to a rejection of CQICH as a result of an override, estimate a downlink channel quality information for the subscriber based on a current set of uplink channel quality information; and
   in response to a reception of the HARQ ACK information, update the subscriber uplink channel quality information.

6. The base station of claim 5, wherein the utility further is configured to:
   maintain a location of the control region designated for HARQ ACKCH and CQICH for uplink sub-frames; and
   provide a configurable option to activate and de-activate the sharing of the uplink control region for HARQ ACKCH and CQICH.

7. The base station of claim 5, wherein the utility is configured to estimate a downlink channel quality information for the subscriber by:
   retrieving a mapping table of empirical data relating uplink and downlink channel information; and
   generating downlink channel information from uplink channel information utilizing the mapping table.

8. The base station of claim 5, wherein the utility further is configured to:
   provide a scheduling offset, wherein the offset is appropriately determined to avoid multiple users reporting CQICH information in a same frame; and
   assign CQICH information to a frame based on the scheduling offset.

* * * * *